United States Patent
Allaire

(10) Patent No.: US 7,338,257 B2
(45) Date of Patent: Mar. 4, 2008

(54) DEVICE FOR INTERACTING WITH A FLUID MOVING RELATIVE TO THE DEVICE AND VEHICLE INCLUDING SUCH A DEVICE

(75) Inventor: Serge Allaire, 3365 Croissant Francois-Brassard, Boisbriand, Quebec (CA) J7H 1L8

(73) Assignee: Serge Allaire, Boisbriand (CA)

( * ) Notice: Subject to any disclaimer, the term of this patent is extended or adjusted under 35 U.S.C. 154(b) by 0 days.

(21) Appl. No.: 10/563,802

(22) PCT Filed: Jul. 8, 2004

(86) PCT No.: PCT/CA2004/001001

§ 371 (c)(1),
(2), (4) Date: Jan. 9, 2006

(87) PCT Pub. No.: WO2005/005824

PCT Pub. Date: Jan. 20, 2005

(65) Prior Publication Data

US 2006/0171805 A1 Aug. 3, 2006

Related U.S. Application Data

(60) Provisional application No. 60/485,705, filed on Jul. 10, 2003.

(51) Int. Cl.
*F01B 23/02* (2006.01)
(52) U.S. Cl. .................... 416/55; 416/87; 416/142
(58) Field of Classification Search ........... 415/133, 415/140, 141; 416/55, 87, 88, 54, 142, 143; 180/2.2, 65.3, 165
See application file for complete search history.

(56) References Cited

U.S. PATENT DOCUMENTS

| 412,099 | A | * | 10/1889 | Keller ................... 416/101 |
| 858,215 | A |   | 6/1907  | Robinson et al. |
| 1,640,891 | A |   | 8/1927 | Fritzel |
| 1,674,169 | A |   | 6/1928 | Flettner |
| 2,041,103 | A | * | 5/1936 | Zegers ................... 416/101 |
| 2,569,983 | A |   | 10/1951 | Favre |
| 3,878,913 | A |   | 4/1975 | Lionts et al. |
| 4,113,299 | A |   | 9/1978 | Johnson et al. |
| 4,141,425 | A |   | 2/1979 | Treat |

(Continued)

FOREIGN PATENT DOCUMENTS

DE 3208376 A1 9/1983

(Continued)

*Primary Examiner*—Edward K. Look
*Assistant Examiner*—Dwayne J White

(57) ABSTRACT

A device (10) for interacting with a fluid (12) moving relative to the device. The device comprises a body with an axis of rotation (22) and a periphery (24). The body is rotatable about the axis of rotation. The device also comprises a plurality of vanes (16i) associated with the body. Each one of the plurality of vanes is movable between an extended position relative to the periphery of the body and a retracted position relative to the periphery of the body. The device further comprises a control mechanism (18) coupled to the plurality of vanes for selectively moving each one of the plurality of vanes between the extended position and the retracted position during rotation of the body. A vehicle and a stationary energy generator including a device as described above are also provided.

28 Claims, 11 Drawing Sheets

U.S. PATENT DOCUMENTS

| | | |
|---|---|---|
| 4,254,843 A | 3/1981 | Han et al. |
| 4,423,368 A * | 12/1983 | Bussiere .................... 322/35 |
| 4,502,724 A | 3/1985 | Grenadier |
| 4,602,584 A | 7/1986 | North et al. |
| 5,051,059 A | 9/1991 | Rademacher |
| 5,236,149 A | 8/1993 | MacKay |
| 5,287,004 A | 2/1994 | Finley |
| 5,908,217 A | 6/1999 | Englar |
| 5,920,127 A | 7/1999 | Damron et al. |
| 6,286,892 B1 | 9/2001 | Bauer et al. |
| 6,365,984 B1 | 4/2002 | Shu |
| 6,448,668 B1 | 9/2002 | Robitaille |
| 6,464,167 B2 | 10/2002 | Hayes |
| 6,484,971 B2 | 11/2002 | Layukallo |
| 6,688,842 B2 | 2/2004 | Boatner |
| 2002/0153178 A1 | 10/2002 | Limonius |

FOREIGN PATENT DOCUMENTS

| | | |
|---|---|---|
| DE | 3341514 A1 | 5/1985 |
| DE | 4120472 A1 | 7/1992 |
| EP | 1 079 104 A1 | 2/2001 |
| FR | 2 854 858 A1 | 11/2004 |
| GB | 2 205 615 A | 12/1988 |
| JP | 08028431 A | 1/1996 |
| WO | WO 03/029646 A1 | 4/2003 |
| WO | PCT/CA2004/001001 | 11/2004 |

* cited by examiner

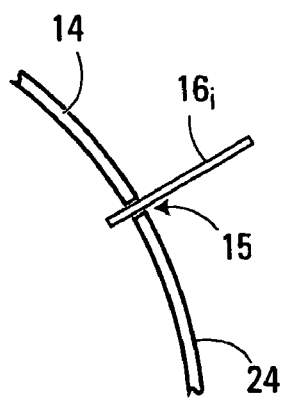
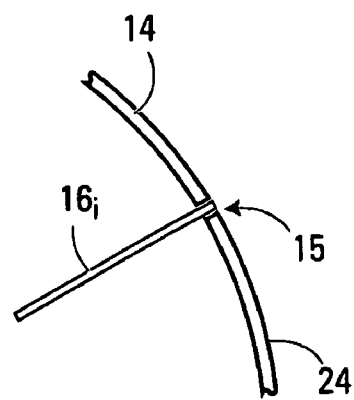
FIG. 2A   FIG. 2B
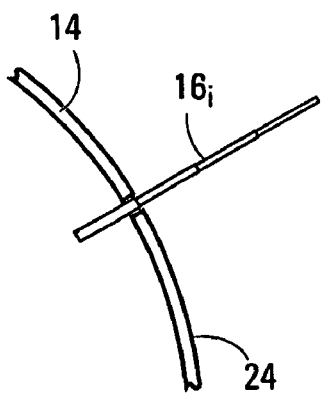
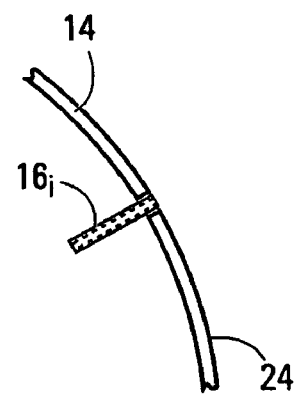
FIG. 2C   FIG. 2D
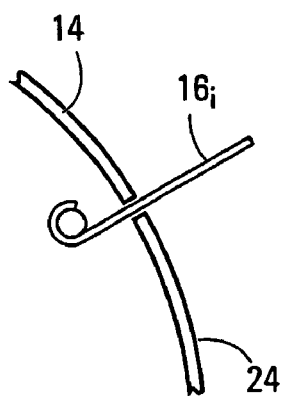
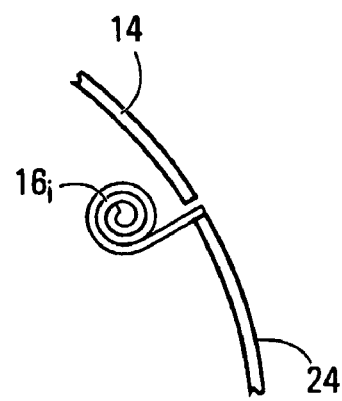
FIG. 2E   FIG. 2F

DEVICE FOR INTERACTING WITH A FLUID MOVING RELATIVE TO THE DEVICE AND VEHICLE INCLUDING SUCH A DEVICE

CROSS-REFERENCE TO RELATED APPLICATION

The present application claims priority from U.S. provisional application No. 60/485,705 filed on Jul. 10, 2003.

FIELD OF THE INVENTION

The present invention relates to the field of energy converters. Mote particularly, the invention relates to a device for interacting with a fluid moving relative to the device and to a vehicle including such a device.

BACKGROUND OF THE INVENTION

Whenever there is relative movement between a fluid and a body, the fluid exerts a force on the body in the direction of relative movement between the fluid and the body. This force is known as drag.

When the body is a vehicle, such as an automobile, a train, a watercraft, an aircraft or some other type of vehicle, drag is always present and opposes to some extent the motion of the vehicle. For instance, when the fluid through which a vehicle moves is air, the air exerts a drag on the vehicle that opposes the motion of the vehicle. In particular, the drag exerted on the vehicle is greatest when the wind direction is opposite to the direction of motion of the vehicle. Thus, the air moving relative to the vehicle, and particularly the wind, is characterized by an important amount of energy that opposes the motion of the vehicle.

Devices have been developed to extract energy from fluids moving relative to the devices and to convert the extracted energy into mechanical or electrical energy. Typically, however, existing devices inefficiently expend some of the extracted energy as a result of their design and leave room for improvement. Furthermore, existing devices are typically part of stationary energy generators and have not been successfully applied to vehicles for allowing extraction of energy from fluids through which the vehicles move, while not increasing drag forces applied on the vehicles.

Accordingly, there is a need for an improved device for interacting with a fluid moving relative to the device and which can be used in a vehicle or in a stationary energy generator.

SUMMARY OF THE INVENTION

In accordance with a broad aspect, the invention provides a device for interacting with a fluid moving relative to the device. The device comprises a body characterized by an axis of rotation and having a periphery. The body is rotatable about the axis of rotation. The device also comprises a plurality of vanes associated with the body. Each one of the plurality of vanes is movable between an extended position relative to the periphery of the body and a retracted position relative to the periphery of the body. The device further comprises a control mechanism coupled to the plurality of vanes for selectively moving each one of the plurality of vanes between the extended position and the retracted position during rotation of the body.

In accordance with another broad aspect, the invention provides a vehicle including a device for interacting with a fluid moving relative to the device. The device comprises a body characterized by an axis of rotation and having a periphery. The body is rotatable about the axis of rotation. The device also comprises a plurality of vanes associated with the body. Each one of the plurality of vanes is movable between an extended position relative to the periphery of the body and a retracted position relative to the periphery of the body. The device further comprises a control mechanism coupled to the plurality of vanes for selectively moving each one of the plurality of vanes between the extended position and the retracted position during rotation of the body.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of specific embodiments of the present invention is provided herein below, by way of example only, with reference to the accompanying drawings, in which:

FIGS. 2A and 2B are diagrammatic views of a first specific example of implementation of a vane of the device in which the vane is respectively in an extended position and in a retracted position;

FIGS. 2C and 2D are diagrammatic views of a second specific example of implementation of a vane of the device in which the vane is respectively in an extended position and in a retracted position;

FIGS. 2E and 2F are diagrammatic views of a third specific example of implementation of a vane of the device in which the vane is respectively in an extended position and in a retracted position;

Figure 1A:
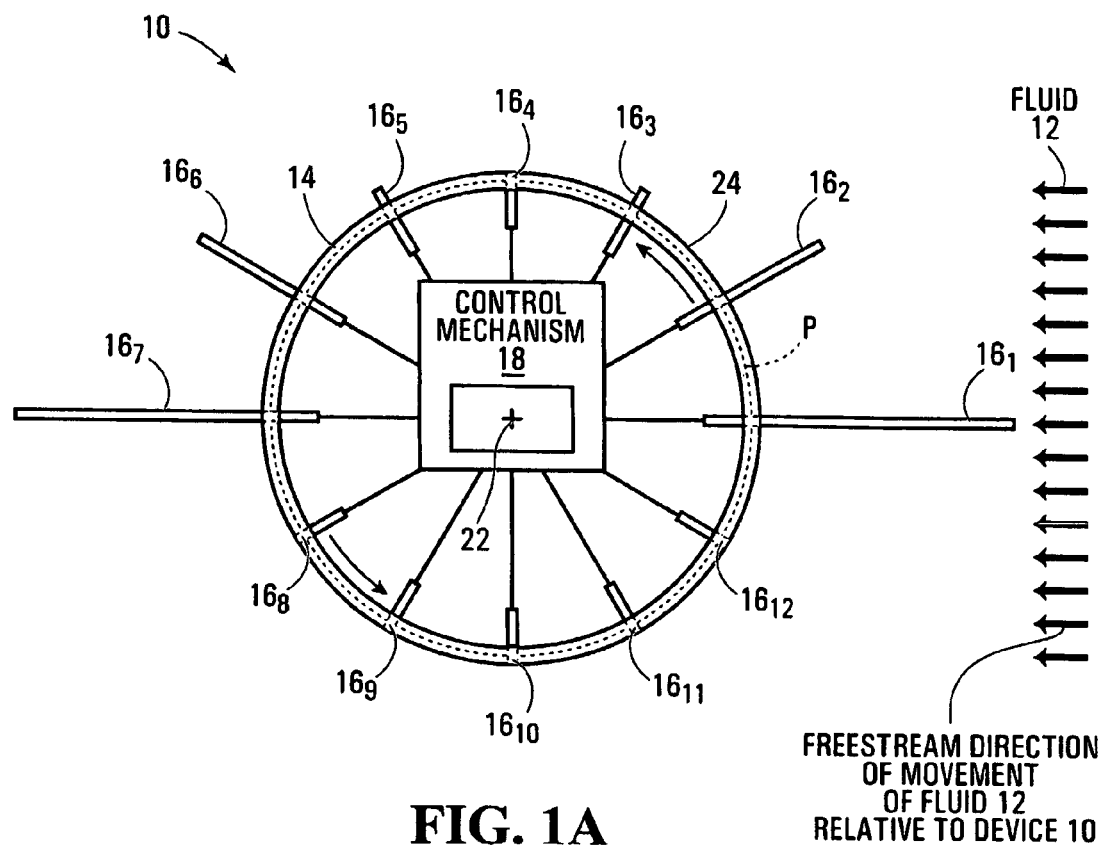
FIG. 1A is a diagrammatic cross-sectional view of a device for interacting with a fluid moving relative to the device, in accordance with a specific non-limiting example of implementation of the present invention.

In the drawings, the embodiments of the invention are illustrated by way of examples. It is to be expressly understood that the description and drawings are only for the purpose of illustration and are an aid for understanding. They are not intended to be a definition of the limits of the invention.

DETAILED DESCRIPTION

FIG. 1A shows a device 10 for interacting with a fluid 12 moving relative to the device 10, in accordance with a specific non-limiting example of implementation of the invention. The fluid 12 can be air, water, or any other liquid or gas. The device 10 is configured such that, when there is relative movement between the device 10 and the fluid 12, the device 10 extracts energy from the moving fluid 10 and converts this energy into mechanical energy or electrical energy which can subsequently be used in various applications. In addition, the device 10 is configured such as to at least partially alleviate deleterious drag effects caused by the relative movement between the fluid 12 and the device 10. In one possible application, the device 10 can be used in a vehicle, as described in further detail below. In another possible application, also as described in further detail below, the device 10 can be used in different contexts in which extraction of energy from a moving fluid is required, such as a windmill, for example.

With continued reference to FIG. 1A, the device 10 comprises a body 14, a plurality of vanes $16_1$-$16_{12}$, and a control mechanism 18.

The body 14 is characterized by an axis of rotation 22 and has a periphery 24. The body 14 is capable of rotating about the axis of rotation 22. The body 14 is positioned such that the axis of rotation 22 is transverse to a freestream direction of movement of the fluid 12 relative to the body 14. The freestream direction of movement of the fluid 12 relative to the body 14 is the direction of movement of the fluid 12 relative to the body 14 at a point where streamlines of the fluid 12 are uninfluenced by the presence of the device 10.

In the particular example of implementation shown, the periphery 24 of the body 14 is circular in cross-section, such that the body 14 can be a cylinder or a sphere. However, it is to be understood that the periphery 24 of the body 14 can have any desired configuration including but not limited to circular, elliptical, streamlined, or any other configuration. It is also to be understood that the dimensions of the body 14 shown in FIG. 1A are for illustration purposes only. Generally, the body 14 can have any desired dimensions without departing from the scope of the present invention. Furthermore, in the particular example of implementation shown, the body 14 includes a hollow interior space. However, it is to be understood that the hollow interior space can be omitted and that the body 14 can also surround another structure or body, without departing from the scope of the present invention.

Each one of the vanes $16_1$-$16_{12}$ is associated with the body 14 and can be implemented as a flat plate or as a curved or streamlined blade, such as an airfoil. In the specific example of implementation shown in FIG. 1A, the device 10 includes twelve vanes $16_1$-$16_{12}$. Generally, however, the device 10 can include one or more vanes without departing from the scope of the invention.

During rotation of the body 14, each one of the vanes $16_1$-$16_{12}$ moves along a circular path P around the axis of rotation 22 of the body 14. The path P is thus conceptually dividable into four quadrants: a first front quadrant, a first back quadrant, a second back quadrant, and a second front quadrant.

In addition, each one of the vanes $16_1$-$16_{12}$ is movable between an extended position relative to the periphery 24 of the body 14 and a retracted position relative to the periphery 24 of the body 14. In the extended position, a particular one of the vanes $16_1$-$16_{12}$ projects a first distance from the periphery 24 of the body 14. In the example of implementation shown in FIG. 1A, the vane $16_1$ is in the extended position. In the retracted position, a particular one of the vanes $16_1$-$16_{12}$ projects a second distance from the periphery 24 of the body 14, the second distance being less than the first distance. It is to be understood that the second distance can be equal to zero, in which case the particular one of the vanes $16_1$-$16_{12}$ in the retracted position does not project from the periphery 24 of the body 14. In the example of implementation shown in FIG. 1A, the vane $16_4$ is in the retracted position. In this particular case, the second distance is equal to zero such that the vane $16_4$ does not project from the periphery 24 of the body 14.

Each one of the vanes $16_1$-$16_{12}$ can move between the extended position and the retracted position in various manners. For example, FIGS. 2A and 2B show an example of implementation in which a vane $16_i$ moves between the extended position and the retracted position via a respective slot 15 provided in the periphery 24 of the body 14. FIGS. 2C and 2D show another example of implementation in which a vane $16_i$ includes a plurality of telescoping elements such that the vane $16_i$ telescopically moves between the extended position and the retracted position. FIGS. 2E and 2F show a further example of implementation in which a vane $16_i$ is capable of winding and unwinding such that the vane $16_i$ winds and unwinds between the extended position and the retracted position. Although FIGS. 2A to 2F illustrate specific examples of implementation, it is to be understood that various other implementations allowing the vanes $16_1$-$16_{12}$ to move between the extended position and the retracted position are possible without departing from the scope of the present invention.

With continued reference to FIG. 1A, the control mechanism 18 is coupled to each one of the vanes $16_1$-$16_{12}$. The control mechanism 18 is operative to selectively move each one of the vanes $16_1$-$16_{12}$ between the extended position and the retracted position during rotation of the body 14. That is, as the body 14 rotates and the vanes $16_1$-$16_{12}$ move along the path P, the control mechanism 18 is operative to control the position of the vanes $16_1$-$16_{12}$ such that any particular one of the vanes $16_1$-$16_{12}$, is either in the extended position, in the retracted position, or in any intermediate position between the extended position and the retracted position.

Figure 1B:
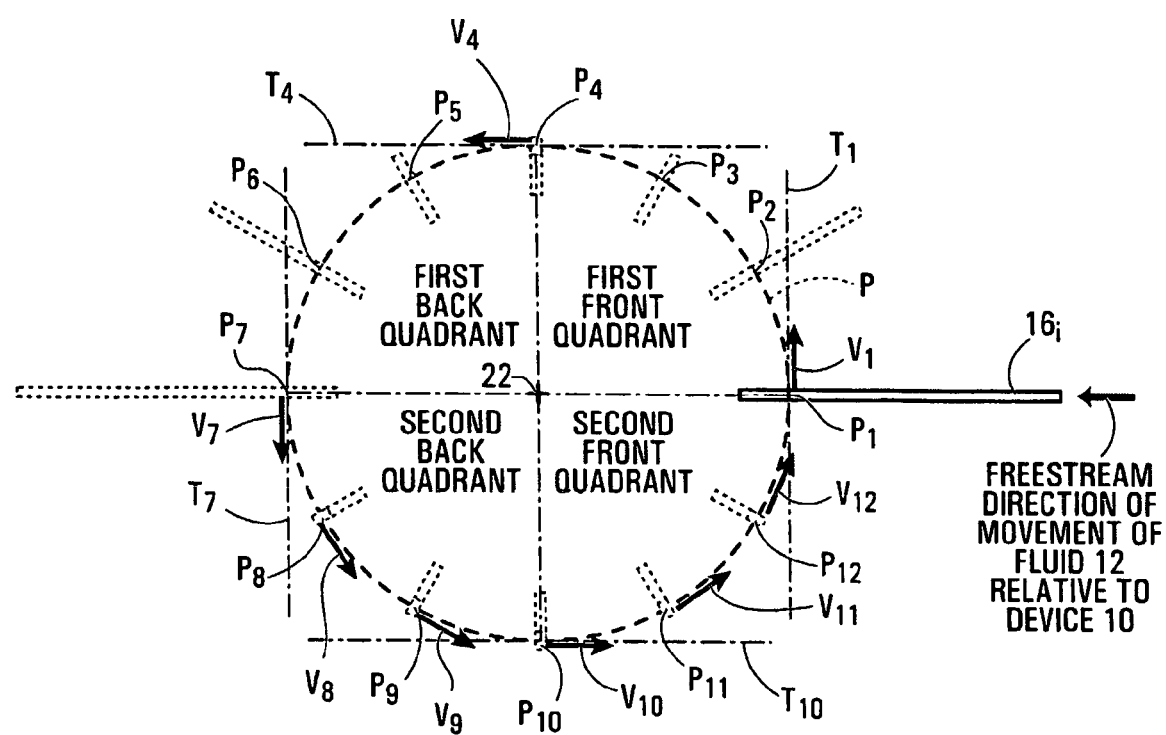
FIG. 1B illustrates an extension and retraction pattern of a vane of the device shown in FIG. 1A.

For example, FIG. 1B shows the various positions of a vane $16_i$ during rotation of the body 14, as the vane $16_i$ moves along the path P under action of the control mechanism 18. It is to be understood that the vane $16_i$ represents any one of the vanes $16_1$-$16_{12}$ as it moves along the path P. It is also to be understood that FIG. 1B illustrates only one possible extension and retraction pattern of the vanes $16_1$-$16_{12}$ as they move along the path P during rotation of the body 14. Generally, the control mechanism 18 can be configured such as to interact with the vanes $16_1$-$16_{12}$ in order to produce any desired extension and retraction pattern of the vanes $16_1$-$16_{12}$ as they move along the path P during rotation of the body 14.

In this specific example of implementation, the control mechanism 18 controls the position of the vane $16_i$ such that, at point $P_1$ on the path P, the vane $16_i$ is in the extended position. In this embodiment, at the point $P_1$, a tangent $T_1$ to the path P is substantially perpendicular to the freestream direction of movement of the fluid 12 relative to the device 10. In other words, a tangential velocity $V_1$ of the vane $16_i$ at the point $P_1$ is substantially perpendicular to the freestream direction of movement of the fluid 12 relative to the device 10. For the purposes of this description, it is to be understood that the tangential velocity of a vane refers to the velocity of the vane relative to the axis of rotation 22 of the body 14 due to the rotation of the body 14. In other embodiments, the vane $16_i$ can be in the extended position at a certain point on the path P where a tangent to the path P (or the tangential velocity of the vane $16_i$) is at a certain angle to the freestream direction of movement of the fluid 12 relative to the device 10. For example the certain angle can be in the range of about 75° to about 105°, more preferably in the range of about 85° to about 95°.

As the vane $16_i$ moves along the first front quadrant of the path P, the control mechanism 18 progressively moves the vane $16_i$ into the retracted position. Thus, at points $P_2$ and $P_3$ on the path P, the vane $16_i$ is in positions intermediate the extended position and the retracted position.

When the vane $16_i$ reaches point $P_4$ on the path P, the vane $16_i$ is in the retracted position. In this embodiment, at the point $P_4$, a tangent $T_4$ to the path P is substantially parallel to the freestream direction of movement of the fluid 12 relative to the device 10. In other words, a tangential velocity $V_4$ of the vane $16_1$ at the point $P_4$ is substantially parallel to the freestream direction of movement of the fluid 12 relative to the device 10. In other embodiments, the vane $16_i$ can be in the retracted position at a certain point on the path P where a tangent to the path P (or the tangential velocity of the vane $16_i$) is at a certain angle to the freestream direction of movement of the fluid 12 relative to the device 10. For example the certain angle can be in the range of about −15° to about 15°, more preferably in the range of about −5° to about 5°.

As the vane $16_i$ continues to move along the first back quadrant of the path P, the control mechanism 18 progressively moves the vane $16_i$ into the extended position. Thus, at points $P_5$ and $P_6$ on the path P, the vane $16_i$ is in positions intermediate the retracted position and the extended position.

When the vane $16_i$ reaches point $P_7$ on the path P, the vane $16_i$ is once again in the extended position. As was the case for the point $P_1$, at the point $P_7$, a tangent $T_7$ to the path P (or the tangential velocity $V_7$ of the vane $16_i$) is substantially perpendicular to the freestream direction of movement of the fluid 12 relative to the device 10.

As the vane $16_i$ continues to move along the second back and second front quadrants of the path P towards the point $P_1$, the control mechanism 18 controls the position of the vane $16_i$ such that it remains in the retracted position for a majority of its displacement along the path P between the points $P_7$ and $P_1$. In other words, the vane $16_i$ remains in the retracted position along the path P at points where its tangential velocity is directed against the freestream direction of movement of the fluid 12 relative to the device 10, as shown for example at points $P_8$ to $P_{12}$. Of course, depending on the speed at which the control mechanism 18 can move the vane $16_i$ between the extended position and the retracted position, the vane $16_i$ may briefly be in a position intermediate the extended position and the retracted position after the point $P_7$ and before the point $P_1$. Advantageously, the control mechanism 18 is adapted to move the vane $16_i$ into the retracted position over the smallest possible displacement along the path P after the point $P_7$, and to move the vane $16_i$ into the extended position over the smallest possible displacement along the path P before the point $P_1$.

Upon reaching the point $P_1$, the vane $16_i$ starts a new cycle along the path P under rotation of the body 14 and the extension and retraction pattern of the vane $16_i$ is repeated.

It is once again emphasized that FIG. 1B illustrates only one possible extension and retraction pattern of the vanes $16_1$-$16_{12}$ and that, generally, the control mechanism 18 can be configured such as to interact with the vanes $16_1$-$16_{12}$ in order to produce any desired extension and retraction pattern of the vanes $16_1$-$16_{12}$ as they move along the path P during rotation of the body 14.

In order to achieve the desired extension and retraction pattern of the vanes $16_1$-$16_{12}$, the control mechanism 18 can be implemented in various different manners.

Figure 3A:
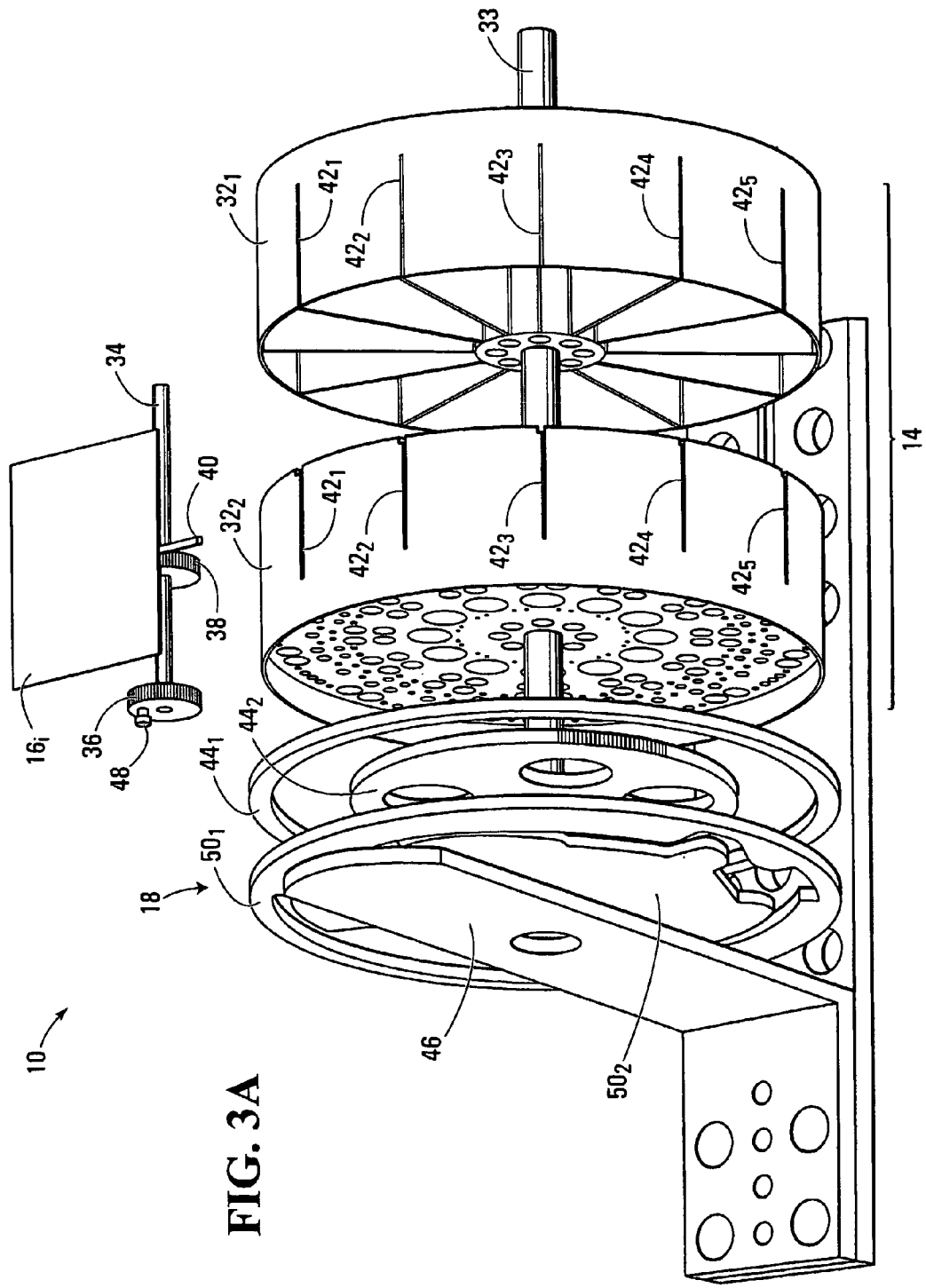
FIG. 3A is a diagrammatic exploded isometric view of a specific example of implementation the device in which a control mechanism of the device is implemented using a mechanical linkage.
Figure 3B:
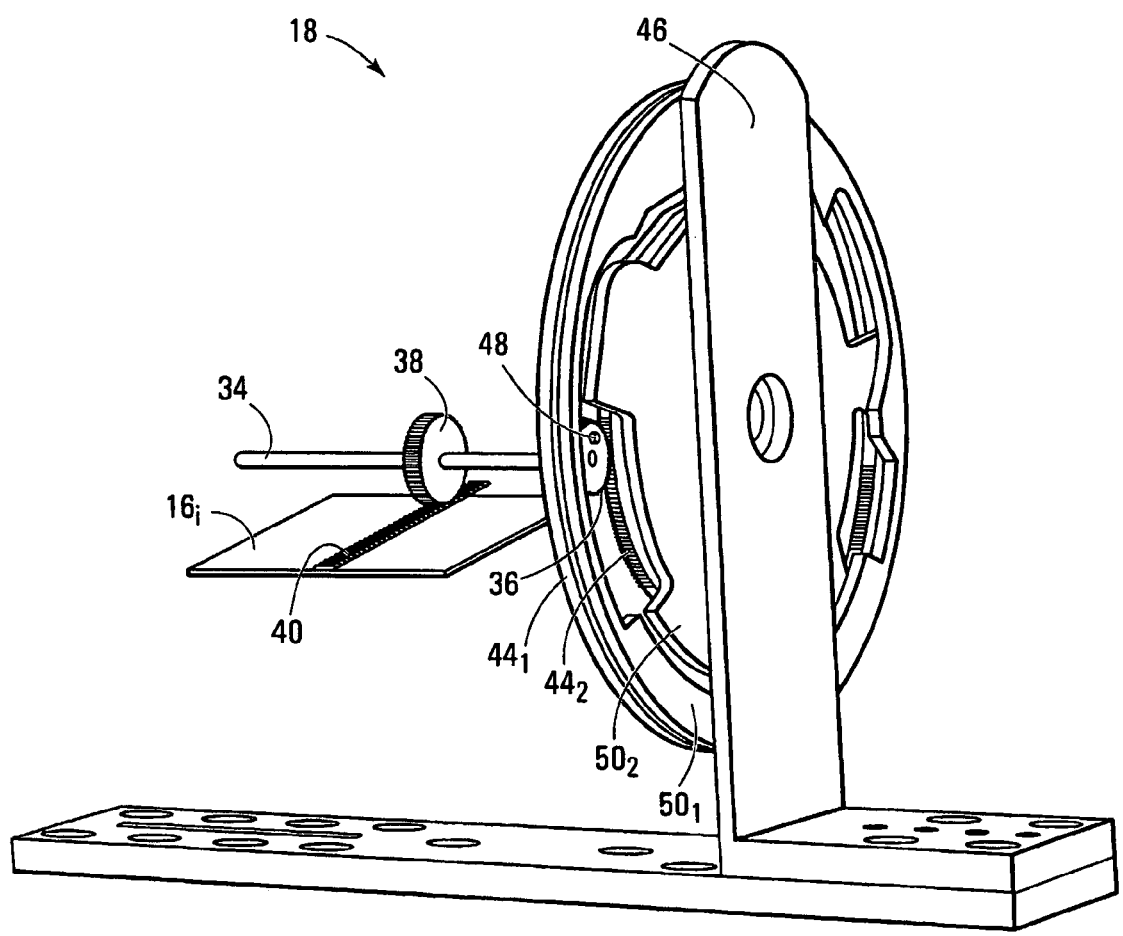
FIG. 3B is a diagrammatic isometric view of the control mechanism of the device shown in FIG. 3A.

FIGS. 3A and 3B show a specific example of implementation of the device 10 in which the control mechanism 18 is implemented using a mechanical linkage including gears, cams and cam followers. In this specific example, the device 10 includes a cylindrical body 14 formed of two disks $32_1$-$32_2$ that are joined together. The disks $32_1$-$32_2$ are adapted to receive twelve sets of shafts 34, gears 36 and 38, and racks 40 which interact with the vanes $16_1$-$16_{12}$ (only one of which is shown as $16_i$ in FIGS. 3A and 3B) to create the desired extension and retraction pattern of the vanes $16_1$-$16_{12}$. A shaft 33 permits rotation of the body 14 about its axis of rotation.

Each one of the disks $32_1$-$32_2$ is characterized by a plurality of slots $42_1$-$42_{12}$ through which the racks 40 can be extracted or retracted. Since each rack 40 is attached to one of the vanes $16_1$-$16_{12}$, the extension or retraction of a rack 40 results in the extension or retraction of the attached one of the vanes $16_1$-$16_{12}$. Each shaft 34 is rotatable in a counter-clockwise direction, whereby the rotation of a fixed gear 38 located on the shaft 36 and engaging a respective rack 40 causes this rack 40, and thus the attached one of the vanes $16_1$-$16_{12}$, to extend. Similarly, each shaft 34 is rotatable in a clockwise direction for retracting the respective rack 40 and the attached one of the vanes $16_1$-$16_{12}$.

The rotation of each shaft 34 is caused by rotation of the body 14 about its axis of rotation. Specifically, when the body 14 rotates, the gear 36 on each shaft 34 interacts with fixed gears $44_1$ and $44_2$ located on a fixed frame 46. In addition, a cam follower 48 on each gear 36 interacts with fixed cams $50_1$ and $50_2$ located on the fixed frame 46. Thus, clockwise rotation, counter-clockwise rotation, or non-rotation of each shaft 34 is determined by the positions of the gear teeth on the fixed gears $44_1$ and $44_2$ and the design of the camming surfaces of fixed cams $50_1$ and $50_2$. In return, the clockwise rotation, counter-clockwise rotation, or non-rotation of each shaft 34 determines the extension or retraction of each one of the vanes $16_1$-$16_{12}$.

Figure 4:
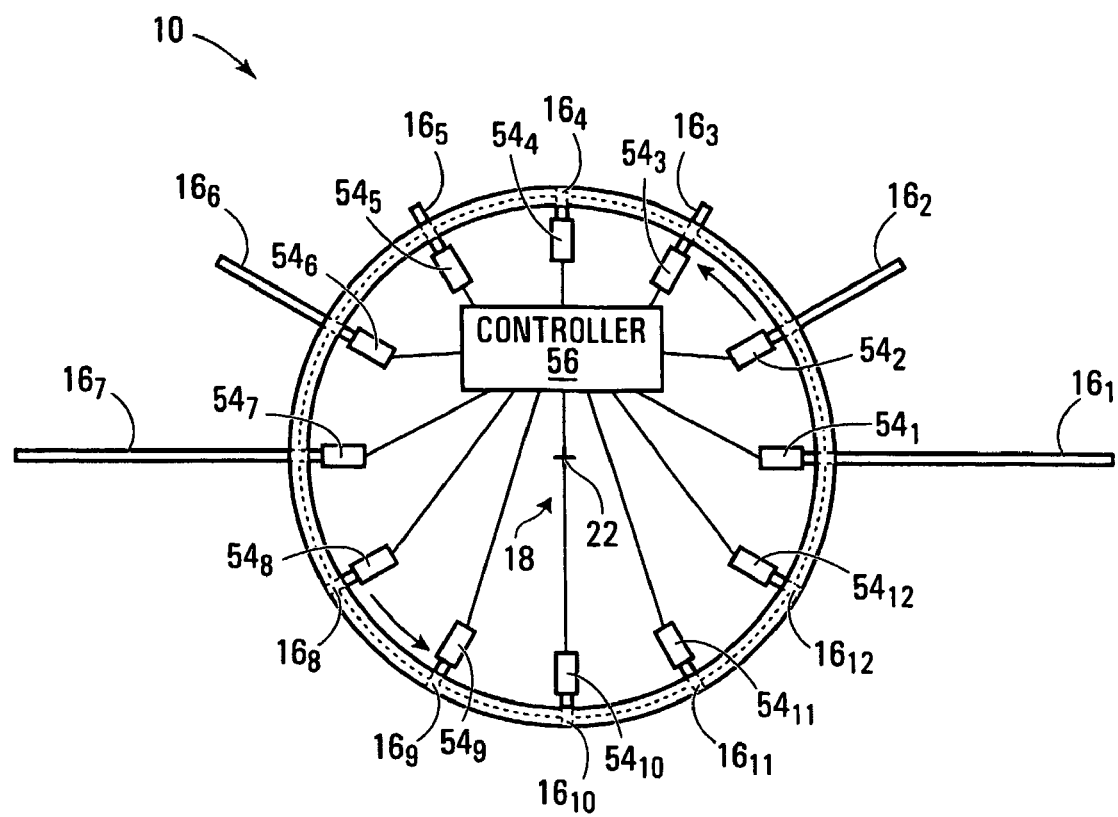
FIG. 4 is a diagrammatic cross-sectional view of the device in which the control mechanism includes a plurality of actuators and a controller.

FIG. 4 shows another specific example of implementation in which the control mechanism 18 includes a plurality of actuators $54_1$-$54_{12}$ and a controller 56 coupled to the actuators $54_1$-$54_{12}$. Each one of the actuator $54_1$-$54_{12}$ is connected to a respective one of the vanes $16_1$-$16_2$ and is adapted to move the respective one of the vanes $16_1$-$16_2$ between the extended position and the retracted position. The controller 56 is configured to selectively activate or deactivate the actuators $54_1$-$54_{12}$ as the vanes $16_1$-$16_2$ move along the path P due to rotation of the body 14, in order to produce the desired extension and retraction pattern of the vanes $16_1$-$16_2$. The actuators $54_1$-$54_{12}$ can be implemented, for instance, as electrical actuators, such as solenoids, or as pneumatic or hydraulic actuators. Similarly, the controller 56 can be implemented, for example, as an electronic controller or as a pneumatic or hydraulic controller. Advantageously, implementing the control mechanism 18 using the plurality of actuators 54$_1$-54$_{12}$ and the controller 56 requires significantly less space than that required for the mechanical linkage implementation of the control mechanism 18 shown in FIGS. 3A and 3B.

It is to be understood that FIGS. 3A, 3B and 4 illustrate only specific non-limiting examples of implementation of the control mechanism 18 and that various other implementations of the control mechanism 18 are possible without departing from the scope of the present invention.

Referring back to FIG. 1A, it will thus be appreciated that, as the fluid 12 moves relative to the device 10, lift and drag forces of varying magnitudes are applied on the vanes 16$_1$-16$_{12}$, thereby causing rotation of the body 14 as the vanes 16$_1$-16$_{12}$ move along the path P. These lift and drag forces acting on the vanes 16$_1$-16$_{12}$ as they move along the path P and cause rotation of the body 14 thus represent an amount of energy, the energy being extracted from the fluid 12 moving relative to the device 10. The energy associated with the movement of the vanes 16$_1$-16$_{12}$ and rotation of the body 14 can be transmitted to a remote device (not shown) via a transmission mechanism (not shown) connecting the body 14 and the remote device. For example, the transmission mechanism can include a shaft connected to the body 14 and the remote device. The remote device is operative to convert the energy associated with rotation of the body 14 and the movement of the vanes 16$_1$-16$_{12}$ into mechanical or electrical energy. For example, the remote device can be a motor or a generator.

Advantageously, in the particular example of implementation shown, the movement of the vanes 16$_1$-16$_{12}$ between the extended and retracted positions as the vanes 16$_1$-16$_{12}$ move along the path P is such that the presence of the vanes 16$_1$-16$_{12}$ does not result in an increase of the total frontal area of the body 14. This is particularly useful in applications where the device 10 actually moves against the fluid 12, such as in applications in which the device 10 is used as or on a vehicle, since it reduces deleterious drag effects on the moving device 10.

In addition, in the particular example of implementation shown, since the vanes 16$_1$-16$_{12}$ are in the retracted position as they move along the second back and second front quadrants of the path P (from the point P$_7$ to the point P$_1$ in FIG. 1B), the vanes 16$_1$-16$_{12}$ do not have to fight the fluid resistance which would normally be encountered if the vanes 16$_1$-16$_{12}$ remained in the extended position. In other words, the drag applied on the vanes 16$_1$-16$_{12}$ as they move along the second back and second front quadrants of the path P is less than the drag that would be applied if the vanes 16$_1$-16$_{12}$ remained in the extended position (in this particular case, no drag is applied on the vanes 16$_1$-16$_{12}$ since they do not extend beyond the periphery 24 of the body 14). This is beneficial to the efficiency of the device 10 since substantially no energy is expended to move the vanes 16$_1$-16$_{12}$ against drag forces adverse to the direction of motion of the vanes 16$_1$-16$_{12}$.

Therefore, it will be appreciated that the device 10 is configured such that, when there is relative movement between the device 10 and the fluid 12, the device 10 extracts energy from the moving fluid 10 and converts this energy into mechanical energy or electrical energy which can subsequently be used in various applications. In addition, the device 10 is configured such as to at least partially alleviate deleterious drag effects caused by the relative movement between the fluid 12 and the device 10.

The device 10 can be used in various possible applications, some of which will now be discussed.

Figure 5A:
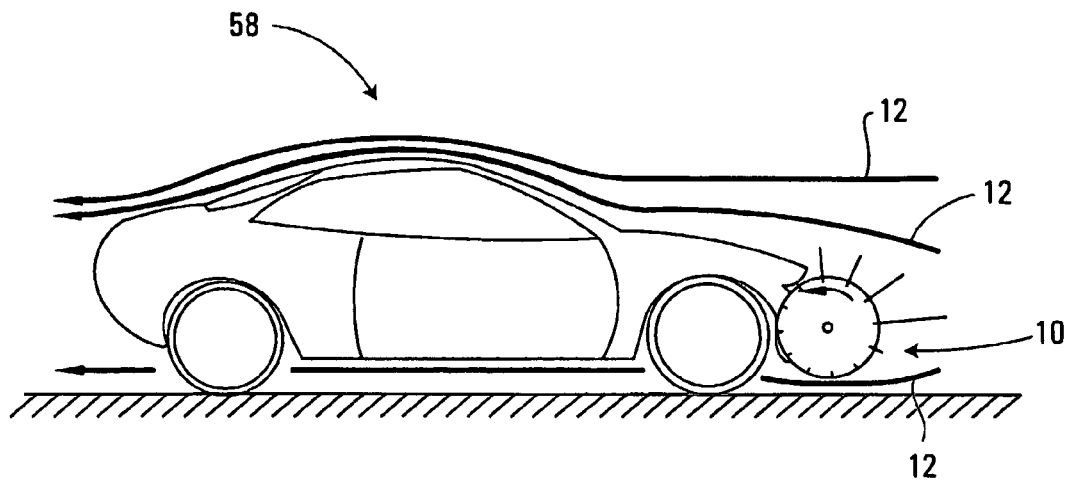
FIGS. 5A and 5B are diagrammatic elevation views of a vehicle on which is mounted a device for interacting with a fluid moving relative to the device, in accordance with a specific example of implementation of the invention.

FIG. 5A illustrates a first possible application for the device 10 in which the device 10 is mounted on a vehicle 58. As the vehicle 58 moves, the fluid 12, which is air in this case, moves relative to the device 10. By way of the control mechanism 18, the vanes 16$_1$-16$_{12}$ of the device 10 are selectively moved between the extended and retracted positions as they are rotated by lift and drag forces applied by the moving air 12. The extension and retraction pattern of the vanes 16$_1$-16$_{12}$ is such that the device 10 extracts energy from the moving air 12 while at least partially alleviating deleterious drag effects tending to reduce the net amount of energy extracted by the device 10.

Specifically, owing to the extension and retraction pattern of the vanes 16$_1$-16$_{12}$, the device 10 does not increase the total frontal area of the vehicle 58 such that deleterious drag effects on the vehicle 58 due to the presence of the device 10 are at least partially alleviated. In addition, the device 10 does not expend energy to move the vanes 16$_1$-16$_{12}$ against drag forces adverse to the direction of motion of the vanes 16$_1$-16$_{12}$.

Overall, the device 10 thus extracts energy from the moving air 12 normally hindering the forward motion of the vehicle 58 as the latter accelerates or cruises. The energy extracted by the device 10 is transmitted to a remote device in the vehicle 58, such as a motor, a battery charger, an electricity generator, or any other device in the vehicle 58.

Figure 5B:
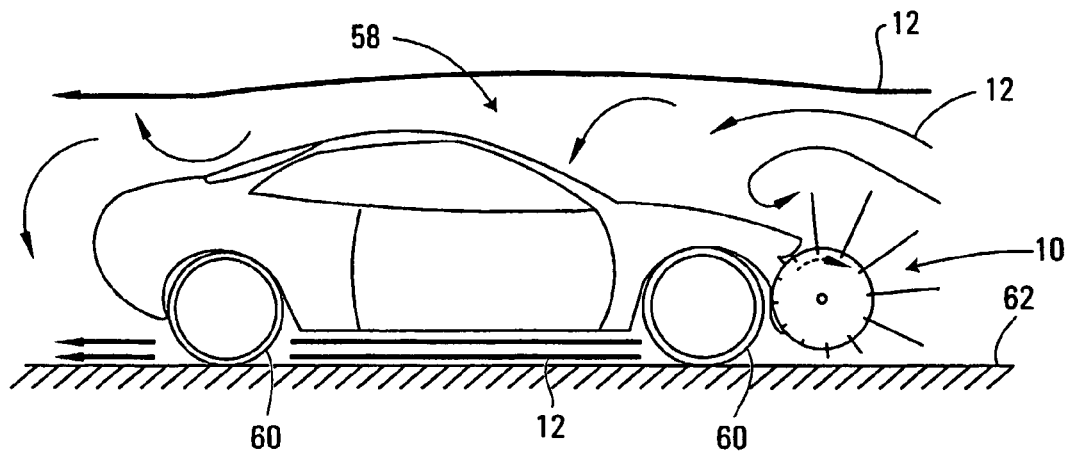

Advantageously, the device 10 can also be used to improve the braking performance of the vehicle 58. FIG. 5B illustrates a situation in which, as the vehicle 58 is braking, the control mechanism 18 selectively moves some of the vanes 16$_1$-16$_{12}$ located on the first and second front quadrants of the path P into the extended position. At the same time, the body 14 is locked into position, i.e. it is prevented from rotating about the axis of rotation 22. This produces an increase in the frontal area of the device 10, which increases the drag applied on the device 10 and thus on the vehicle 58. In other words, when the vehicle 58 is braking, the device 10 is configured such as to generate a larger drag on the vehicle 58 than when the vehicle 58 is not braking. As a result, the braking performance of the vehicle 58 is improved.

Alternatively, instead of locking the body 14 into position, the body 14 can be rotated about the axis of rotation 22 in a direction opposite to the direction of rotation of the body 14 caused by lift and drag forces applied by the moving air 12 on the vanes 16$_1$-16$_{12}$ when the vehicle 58 is accelerating or cruising. In other words, the device 10 is driven against the freestream direction of the moving air 12 (as shown by the dotted arrow in FIG. 5B). In that case, a downward lift force is applied on the device 10 and thus on the vehicle 58. Advantageously, in addition to the increase in drag due to the increase in frontal area, the downward lift force decreases the upward lift on the vehicle 58, which, in turn, increases friction forces between the tires 60 of the vehicle 58 and the road surface 62 thereby further improving the braking performance of the vehicle 58. Furthermore, with the device 10 driven against the freestream direction of the moving air 12, a greater amount of air 12 flows under the vehicle 58. Advantageously, this generates venturi-type effects which again increase friction forces between the tires 60 of the vehicle 58 and the road surface 62, thereby further improving the braking performance of the vehicle 58. In addition to the beneficial effects on the braking performance of the vehicle 58, the generated downward lift force and venturi-type effects generally improve the overall stability of the vehicle 58.

In addition to the above-described examples of operation of the device 10, it is to be understood that the device 10 can be operated in various other manners as the vehicle 58 accelerates, cruises, decelerates, brakes or is immobile. For example, the control mechanism 18 can maintain all of the vanes $16_1$-$16_{12}$ in the retracted position as the vehicle 58 accelerates or cruises, and initiate the extension and retraction pattern of the vanes $16_1$-$16_{12}$ only when the vehicle 58 brakes. In so doing, the device 10 will extract energy from the moving air 12 only when the vehicle 58 is braking. As another example, the control mechanism 18 can initiate the extension and retraction pattern of the vanes $16_1$-$16_{12}$ when the vehicle 58 is immobile (such as when the vehicle 58 is parked or stopped at a red light). In so doing, the device 10 will extract energy from the wind while the vehicle 58 is immobile. As yet another example, when the vehicle 58 accelerates or cruises, the control mechanism 18 can cause an extension and retraction pattern of the vanes $16_1$-$16_{12}$ such as to generate less drag on the vehicle 58 than if the device 10 was omitted from the vehicle 58.

In order to control the operation of the device 10 as the vehicle 58 accelerates, cruises, decelerates, brakes or is immobile, a control unit (not shown) interconnects the device 10 and an accelerator system and a braking system of the vehicle 58.

Figure 6A:
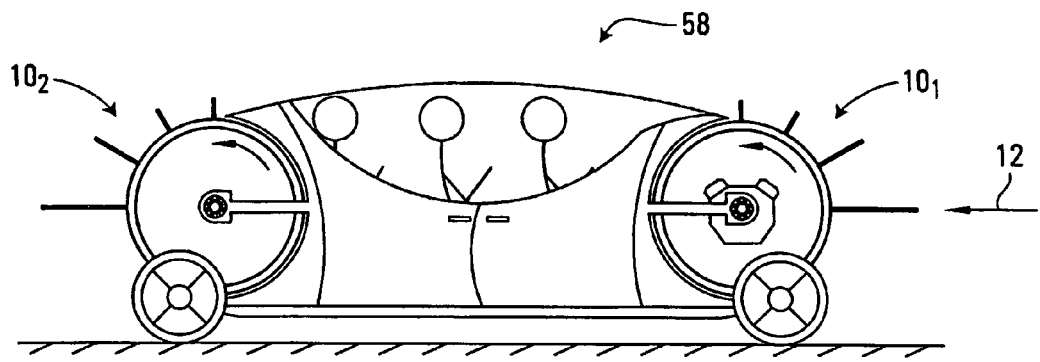
FIGS. 6A to 6C are diagrammatic elevation views of a vehicle on which are mounted two devices for interacting with a fluid moving relative to the devices, in accordance with a specific example of implementation of the invention.
Figure 6B:
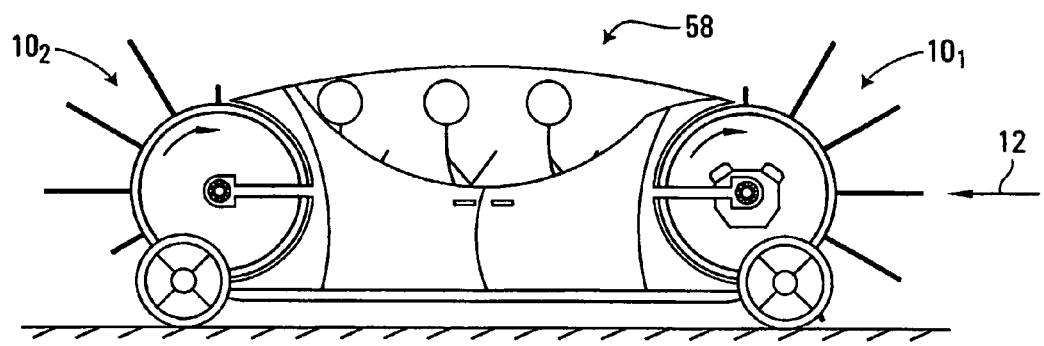
Figure 6C:
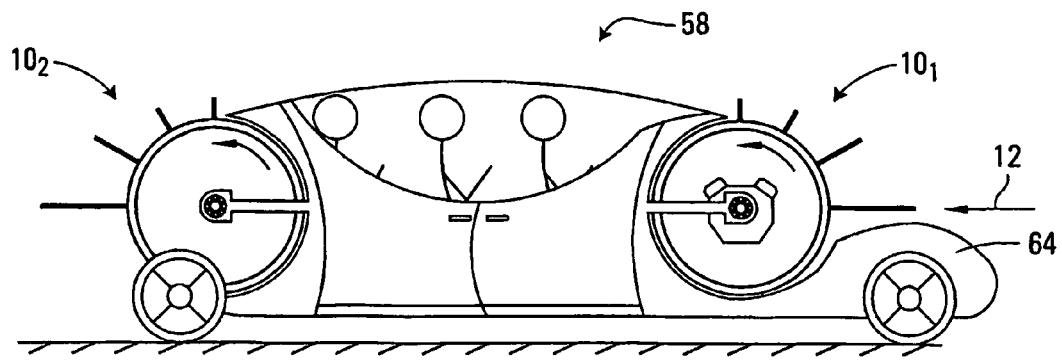

Turning to FIGS. 6A to 6C and FIG. 7, there are shown various other possible implementations of the device 10 on a vehicle 58. Specifically, FIGS. 6A to 6C illustrates specific examples of implementation in which two devices $10_1$ and $10_2$ are mounted on a vehicle 58. Each one of the devices $10_1$ and $10_2$ is configured and operates in the same way as the device 10 previously described. In the example of implementation of FIG. 6C, the front of the vehicle 58 is configured as a deflector 64 adapted to direct a greater amount of air 12 towards the device $10_1$.

Figure 7:
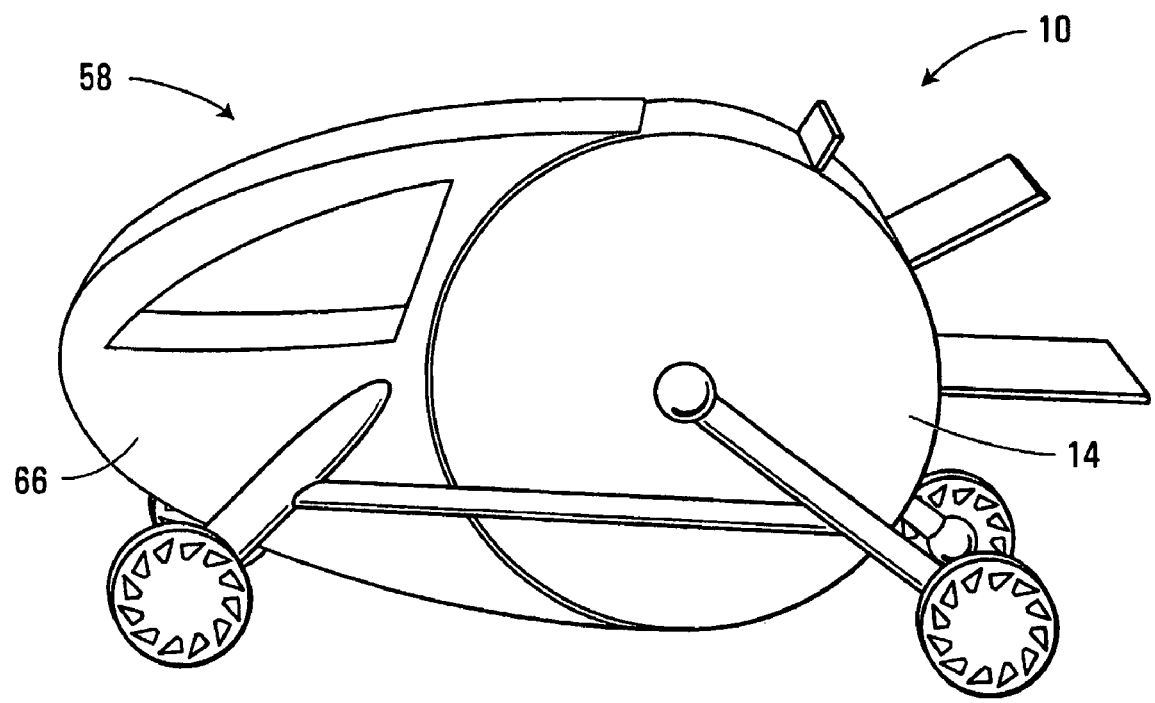
FIG. 7 is a diagrammatic isometric view of a vehicle including a device for interacting with a fluid moving relative to the device, in accordance with a specific example of implementation of the invention.

FIG. 7 illustrates a specific example of implementation in which the body 14 of device 10 represents a significant fraction of the size of the vehicle 58. In this non-limiting example of implementation, the body 14 of the device 10 is internally adapted to receive some of the components and accessories of the vehicle 58 such as the motor, the transmission, the trunk, etc. In order to maximize the available space inside the body 14, the control mechanism 18 is implemented using the minimum amount of space possible. Also, in this non-limiting example of implementation, a rear structure 66 is located at the back of the body 14 of the device 10 such as to enhance the aerodynamics of the vehicle 58 when in motion and to provide space for passengers of the vehicle 58.

In the specific examples of implementation described above, the vehicle 58 is a ground vehicle, more specifically, an automobile. However, it is to be understood that the device 10 can be adapted to be used with other types of ground vehicles, including trucks and trains, as well as with various other types of vehicles, including watercrafts and aircrafts, without departing from the scope of the present invention.

Figure 8A:
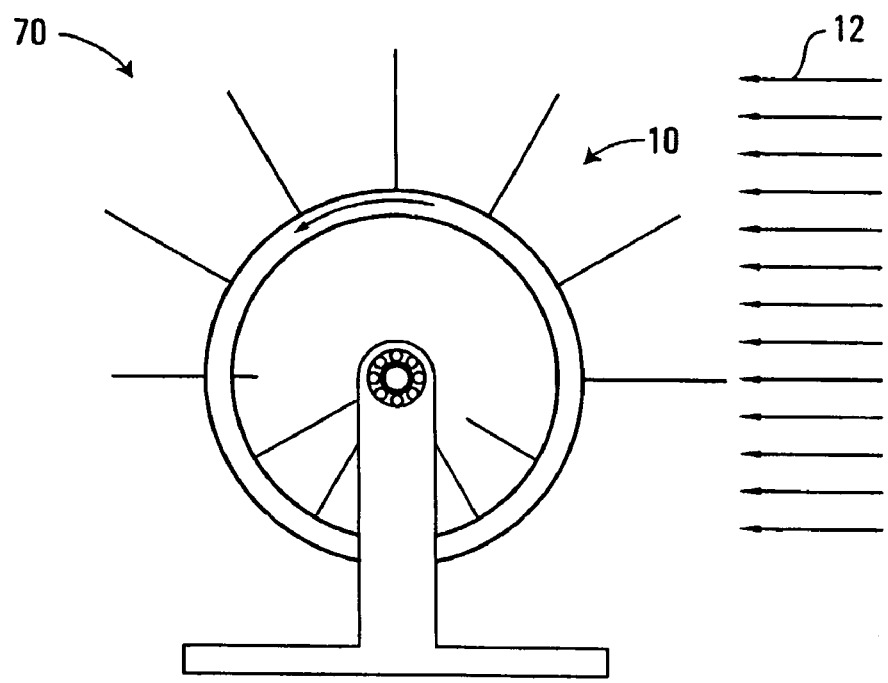
FIGS. 8A to 8C are diagrammatic elevation views of a stationary energy generator including a device for extracting energy from a fluid moving relative to the device, in accordance with a specific example of implementation of the invention.

FIG. 8A illustrates another possible application for the device 10 in which the device 10 is used as part of a stationary energy generator 70, such as a windmill. As the fluid 12, e.g. the wind, moves relative to the device 10, the vanes $16_1$-$16_{12}$ are selectively moved between the extended and retracted positions by the control mechanism 18 as they are moved by lift and drag forces applied by the wind 12, thereby causing rotation of the body 14. The extension and retraction pattern of the vanes $16_1$-$16_{12}$ is such that the device 10 extracts energy from the wind 12 while at least partially alleviating deleterious drag effects tending to reduce the net amount of energy extracted by the device 10.

Specifically, owing to the extension and retraction pattern of the vanes $16_1$-$16_{12}$, the device 10 does not expend energy to move the vanes $16_1$-$16_{12}$ against drag forces adverse to the direction of motion of the vanes $16_1$-$16_{12}$. That is, the varies $16_1$-$16_{12}$ are maintained in the retracted position as they move along the majority of the second back and second front quadrants of the path P such that they do not have to move against adverse drag forces. Also, in this specific example of implementation, the vanes $16_1$-$16_{12}$ are maintained in the extended position for a majority of their movement along the first front and first back quadrants of the path P. In that way, the device 10 maximizes the net amount of energy that it can extract from the wind 12. The energy extracted by the device 10 is transmitted to a remote device, such as an electricity generator, of the stationary energy generator 70.

Figure 8B:
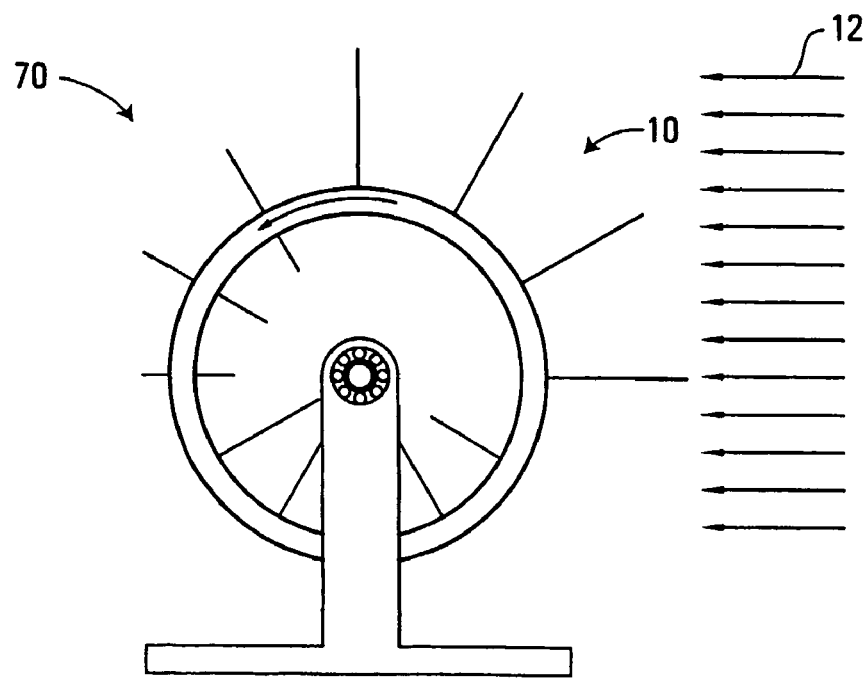
Figure 8C:
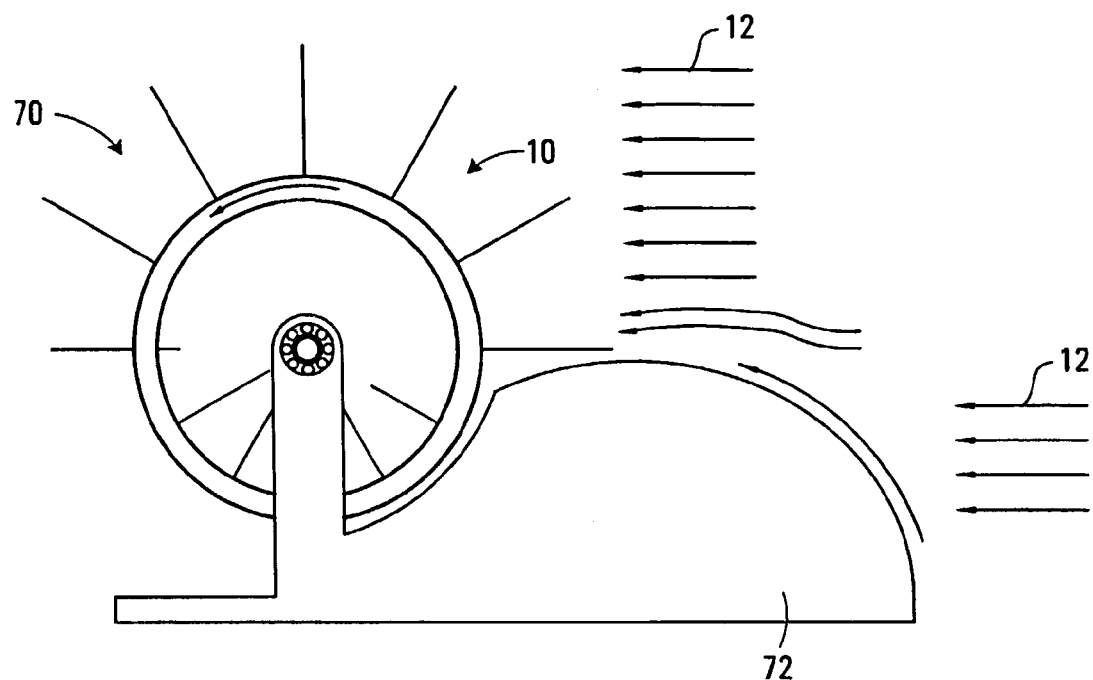

FIG. 8B illustrates a variant extension and retraction pattern of the vanes $16_1$-$16_{12}$ in which the vanes $16_1$-$16_{12}$ are progressively moved into the retracted position as they move along the first back quadrant of the path P. For its part, FIG. 8C illustrates another example of implementation in which the stationary energy generator 70 includes a deflector 72 adapted to direct a greater amount of air 12 towards the device 10. Of course, while the stationary energy generator 70 shown in FIGS. 8A to 8C was referred to as a windmill, it is to be understood that, generally, the energy generator 70 can be any type of turbine used in connection with any type of moving fluid.

Figure 9:
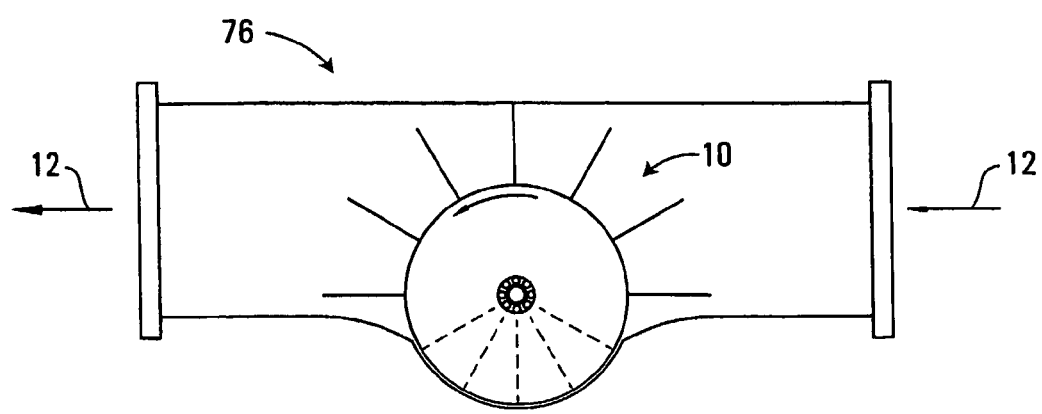
FIG. 9 is a diagrammatic elevation view of a device for adding energy to a fluid moving relative to the device, in accordance with a specific example of implementation of the invention.

Finally, instead of extracting energy from a moving fluid, the device 10 can also be adapted to add energy to a moving fluid with enhanced efficiency. For example, FIG. 9 shows a non-limiting example of implementation in which the device 10 is used as part of a pump 76. By driving the device 10 with a motor (not shown), the device 10 can transmit the energy provided by the motor to a fluid 12 moving through the pump 76. Advantageously, owing to the extension and retraction pattern of the vanes $16_1$-$16_{12}$, the device 10 does not expend energy provided by the motor to move the vanes $16_1$-$16_{12}$ against drag forces adverse to the direction of motion of the vanes $16_1$-$16_{12}$. That is, the vanes $16_1$-$16_{12}$ are maintained in the retracted position as they move along the majority of the second back and second front quadrants of the path P, such that they do not have to move against adverse drag forces. In so doing, the device 10 maximizes the amount of energy provided by the motor that it can add to the fluid 12.

Although various embodiments have been illustrated, this was for the purpose of describing, but not limiting, the invention. Various modifications will become apparent to those skilled in the art and are within the scope of the present invention, which is defined more particularly by the attached claims.

The invention claimed is:

1. A ground vehicle comprising a device for interacting with a fluid moving relative to said device, said device comprising:
   a body characterized by an axis of rotation and having a periphery, said body being rotatable about said axis of rotation;
   a plurality of vanes associated with said body, each one of said plurality of vanes being movable between an extended position relative to said periphery and a retracted position relative to said periphery;

a control mechanism coupled to said plurality of vanes for selectively moving each one of said plurality of vanes between said extended position and said retracted position during rotation of said body; and a transmission mechanism associated with said body for transmitting energy associated with rotation of said body to a remote device in said ground vehicle, said remote device being operative to convert the energy associated with rotation of said body into mechanical or electrical energy.

2. A ground vehicle as defined in claim 1, wherein said control mechanism is operative to selectively move each one of said plurality of vanes such that a first vane of said plurality of vanes moves from said extended position into said retracted position and a second vane of said plurality of vanes concurrently moves from said retracted position into said extended position.

3. A ground vehicle as defined in claim 1, wherein said control mechanism is operative to selectively move each one of said plurality of vanes such that each particular vane is in said extended position when a tangential velocity of said particular vane is at a first angle to a freestream direction of movement of the fluid relative to said device, and is in said retracted position when the tangential velocity of said particular vane is at a second angle to the freestream direction of movement of the fluid relative to said device, said first angle being in the range of about 75° to about 105° and said second angle being in the range of about −15° to about 15°.

4. A ground vehicle as defined in claim 1, wherein said control mechanism is operative to selectively move each one of said plurality of vanes such that each particular vane is in said retracted position when a tangential velocity of said particular vane is directed against a freestream direction of movement of the fluid relative to said device.

5. A ground vehicle as defined in claim 1, wherein each one of said plurality of vanes is movable between said extended position and said retracted position via a slot provided in said periphery of said body.

6. A ground vehicle as defined in claim 1, wherein each one of said plurality of vanes includes a plurality of telescoping elements such that each particular vane is telescopically movable between said extended position and said retracted position.

7. A ground vehicle as defined in claim 1, wherein each one of said plurality of vanes is capable of winding and unwinding such that each particular vane is movable between said extended position and said retracted position by unwinding and winding said particular vane.

8. A ground vehicle as defined in claim 1, wherein said control mechanism includes a mechanical linkage interacting with said plurality of vanes for selectively moving each one of said plurality of vanes between said extended position and said retracted position during rotation of said body.

9. A ground vehicle as defined in claim 1, wherein said control mechanism includes:

a plurality of actuators, each one of said plurality of actuators being connected to a respective vane of said plurality of vanes and being adapted to move said respective vane between said extended position and said retracted position; and a controller coupled to said plurality of actuators, said controller being adapted to selectively activate or deactivate each one of said plurality of actuators.

10. A ground vehicle as defined in claim 1, wherein said transmission mechanism includes a shaft connected to said body and to said remote device.

11. A ground vehicle as defined in claim 1, wherein said remote device is one of a motor, a battery charger, and an electricity generator.

12. A ground vehicle as defined in claim 1, wherein said control mechanism is operative for selectively moving each one of said plurality of vanes between said extended position and said retracted position during rotation of said body without increasing a total frontal area of said ground vehicle.

13. A ground vehicle as defined in claim 1, wherein said control mechanism is operative for selectively moving each one of said plurality of vanes between said extended position and said retracted position such as to generate less drag on said ground vehicle than if said device was omitted from said ground vehicle.

14. A ground vehicle as defined in claim 1, wherein, when said ground vehicle is braking, said control mechanism is operative for selectively moving each one of said plurality of vanes between said extended position and said retracted position so as to generate a larger drag on said ground vehicle than when said ground vehicle is not braking.

15. A ground vehicle as defined in claim 1, wherein, when said ground vehicle is braking, said device is operative for rotating said body about said axis of rotation in a certain direction so as to generate a downward lift force on said ground vehicle and said control mechanism is operative for selectively moving each one of said plurality of vanes between said extended position and said retracted position so as to generate a larger drag on said ground vehicle than when said ground vehicle is not braking.

16. A ground vehicle as defined in claim 1, wherein said device is located at a rear portion of said ground vehicle.

17. A ground vehicle as defined in claim 1, wherein said device is located at a front portion of said ground vehicle.

18. A vehicle comprising a device for interacting with a fluid moving relative to said device, said device comprising:

a body characterized by an axis of rotation and having a periphery, said body being rotatable about said axis of rotation;

a plurality of vanes associated with said body, each one of said plurality of vanes being movable between an extended position relative to said periphery and a retracted position relative to said periphery;

a control mechanism coupled to said plurality of vanes for selectively moving each one of said plurality of vanes between said extended position and said retracted position during rotation of said body; and a transmission mechanism associated with said body for transmitting energy associated with rotation of said body to a remote device in said vehicle said remote device being operative to convert the energy associated with rotation of said body into mechanical or electrical energy.

19. A vehicle as defined in claim 18, wherein said transmission mechanism includes a shaft connected to said body and to said remote device.

20. A vehicle as defined in claim 18, wherein said remote device is one of a motor, a battery charger, and an electricity generator.

21. A vehicle as defined in claim 18, wherein said control mechanism is operative for selectively moving each one of said plurality of vanes between said extended position and said retracted position during rotation of said body without increasing a total frontal area of said vehicle.

22. A vehicle as defined in claim 18, wherein said control mechanism is operative for selectively moving each one of said plurality of vanes between said extended position and said retracted position such as to generate less drag on said vehicle than if said device was omitted from said vehicle.

23. A vehicle as defined in claim 18, wherein, when said vehicle is decelerating, said control mechanism is operative for selectively moving each one of said plurality of vanes between said extended position and said retracted position so as to generate a larger drag on said vehicle than when said vehicle is not decelerating.

24. A vehicle comprising a device for interacting with a fluid moving relative to said device, said device comprising:
- a body characterized by an axis of rotation and having a periphery, said body being rotatable about said axis of rotation;
- a plurality of vanes associated with said body, each one of said plurality of vanes being movable between an extended position relative to said periphery and a retracted position relative to said periphery; and
- a control mechanism coupled to said plurality of vanes for selectively moving each one of said plurality of vanes between said extended position and said retracted position during rotation of said body, said control mechanism being operative for selectively moving each one of said plurality of vanes between said extended position and said retracted position such as to generate less drag on said vehicle than if said device was omitted from said vehicle.

25. A vehicle as defined in claim 24, wherein said control mechanism is operative for selectively moving each one of said plurality of vanes between said extended position and said retracted position during rotation of said body without increasing a total frontal area of said vehicle.

26. A vehicle comprising a device for interacting with a fluid moving relative to said device, said device comprising:
- a body characterized by an axis of rotation and having a periphery, said body being rotatable about said axis of rotation;
- a plurality of vanes associated with said body, each one of said plurality of vanes being movable between an extended position relative to said periphery and a retracted position relative to said periphery; and
- a control mechanism coupled to said plurality of vanes for selectively moving each one of said plurality of vanes between said extended position and said retracted position during rotation of said body, wherein, when said vehicle is braking, said control mechanism is operative for selectively moving each one of said plurality of vanes between said extended position and said retracted position so as to generate a larger drag on said vehicle than when said vehicle is not braking.

27. A vehicle as defined in claim 26, wherein, when said vehicle is braking, said device is operative for rotating said body about said axis of rotation in a certain direction so as to generate a downward lift force on said vehicle.

28. A vehicle comprising a device for interacting with a fluid moving relative to said device, said device comprising:
- a body characterized by an axis of rotation and having a periphery, said body being rotatable about said axis of rotation;
- a plurality of vanes associated with said body, each one of said plurality of vanes being movable between an extended position relative to said periphery and a retracted position relative to said periphery; and
- a control mechanism coupled to said plurality of vanes for selectively moving each one of said plurality of vanes between said extended position and said retracted position during rotation of said body, said control mechanism including:
- a plurality of actuators, each one of said plurality of actuators being connected to a respective vane of said plurality of vanes and being adapted to move said respective vane between said extended position and said retracted position; and
- a controller coupled to said plurality of actuators, said controller being adapted to selectively activate or deactivate each one of said plurality of actuators.

* * * * *

UNITED STATES PATENT AND TRADEMARK OFFICE
CERTIFICATE OF CORRECTION

PATENT NO. : 7,338,257 B2 Page 1 of 1
APPLICATION NO. : 10/563802
DATED : March 4, 2008
INVENTOR(S) : Serge Allaire It is certified that error appears in the above-identified patent and that said Letters Patent is hereby corrected as shown below:

On the title page: Item [75] delete

Serge Allaire, 3365 Croissant Francois-Brassard, Boisbriand, Quebec (CA) J7H 1L8

It should be:

Serge Allaire, 3355 Croissant Francois-Brassard, Boisbriand, Quebec (CA) J7H 1L8

Signed and Sealed this

Tenth Day of June, 2008

JON W. DUDAS
*Director of the United States Patent and Trademark Office*